United States Patent Office 3,397,198
Patented Aug. 13, 1968

3,397,198
DEGRADED CELLULOSE AND ITS
MANUFACTURE
Dahlia S. Greidinger, 98 Hatishbi St., and Herbert Bernstein, 58 Panorama Road, both of Haifa, Israel, and Shimon Epstein, 15 Elon St., Kiryat Bialik, Israel
No Drawing. Filed May 26, 1965, Ser. No. 459,096
Claims priority, application Israel, June 18, 1964, 21,562
9 Claims. (Cl. 260—212)

This invention provides a new kind of degraded or partially depolymerized cellulose consisting of very finely divided amorphous particles insoluble in water but capable of forming colloidal aqueous dispersions. These colloidal dispersions have the consistency of creamy, thick, smooth pastes even at dry-matter contents as low as about 10%.

The invention also provides a process for the manufacture of this degraded cellulose, wherein within a relatively short time, preferably not exceeding about 10 minutes, cellulosic matter is dissolved at a temperature of about 35 to 45° C., in an aqueous sulfuric acid medium containing 65 to 75%, preferably 70 to 73%, by weight of $H_2SO_4$, the solution is diluted, preferably with so much water that the acid concentration is lowered to about 20 to 25% by weight of $H_2SO_4$, and the precipitate of degraded cellulose thereby formed is separated from the acidic aqueous liquor and, if desired, washed and/or neutralized.

It is essential to observe the conditions of temperature and reaction time indicated above. If sulfuric acid of about 70% strength is allowed to act on cellulose for a protracted period of time the cellulose is completely degraded and up to 90% of its weight can be recovered as glucose. In the temperature range of 35 to 45% the cellulose dissolves quickly in sulfuric acid of the strength specified. As a rule about 1 to 3 minutes are required for the dissolution of the cellulosic matter in the acid, and another about 1 to 3 minutes for the viscosity of the solution to drop to the desired degree. Interruption of the process at this stage makes it possible to recover the desired partially depolymerized cellulose.

The cellulosic matter used as a starting material may either be native, such as cotton linters or purified wood pulp, or regenerated, such as viscose rayon. The starting material may be used in the dry or wet condition. However, the speed of dissolution of the material in sulfuric acid depends on the reactivity of the material and on the speed of wetting of the material with the acid. Both of these are slow if the material is very dry. For this reason, the material should contain some moisture. For example, "dry" cotton linters may contain about 10 to 12% of moisture. Or else, the linters may be used wet such as they are received from the bleaching and washing operations. Purified wood pulp should be wetted with some water in order to provide a better contact of the solid material with the aqueous acid medium and to accelerate and complete the dissolution. The water content of the wet starting material, if substantially above 12%, is taken into account for the determination of the required initial concentration of the sulfuric acid. Moreover, since some heat is liberated by the hydration of the sulfuric acid with the water contained in the wet cellulosic material, the initial temperature of the reactants should be so low that by the heat thus evolved the temperature of the reaction mixture is raised to within the range of 35 to 45° C.

The weight:weight ratio of the reactants may vary within wide limits. Optimal proportions will have to be determined empirically according to the nature of the cellulosic matter used as a starting material. As a rule the sulfuric acid will be used in a large excess over the cellulosic material. By way of example, suitable proportions of the reactants may be of the order of 1 to 2 parts by weight of cellulosic material (calculated as dry matter) for 10 parts of sulfuric acid of the selected concentration.

The separation of the precipitate of degraded cellulose from the acidic liquor is suitably effected by filtration.

Where the separated precipitate is neutralized, this can be done, for example, with aqueous caustic alkali or alkali metal carbonate, or with ammonia. The degree to which the degraded cellulose has to be washed free from sulfuric acid or from the sulfate formed by the neutralization depends on the purity required of the product for particular uses thereof.

The degraded cellulose according to the invention is altogether different from known cellulose degradation products in that it is completely amorphous and has a fineness of particle size in the colloidal region. There is no trace left in the product of the fiber network of the original cellulosic matter. The product is, therefore, different from, for example, microcrystalline degraded cellulose, such as the product known by the trademark "Avirin." The viscosity of the degraded cellulose derived from cotton linters according to the invention in a standard cuprammonium solution (15 g./l. of copper and 200 g./l. of ammonia according to the Shirley Institute specifications) is about 2 to 4 centipoises as compared with 13.7 centipoises for "Avirin," which indicates that the product according to the invention has a lower molecular weight than the known microcrystalline degraded cellulose.

The degraded cellulose according to this invention is a valuable material suitable for many different applications. For some of them it can be used in the form of a paste-like aqueous dispersion, e.g., the one directly obtained as the product of the degradation process according to the invention. For some other applications the product will have to be dried. This should be done under mild conditions, advisably below 100° C. and preferably below 70° C. An especially effective method is spray-drying, which may be effected either in air or in vacuo at even lower temperatures, e.g., at room temperature.

Some of the uses to which the degraded cellulose according to the invention can be put, are the following:

*Cleansers.*—The aqueous paste having a dry-matter content of 10–20% by weight can be used as it is as a waterless cleanser. When dirty hands are rubbed with this material, the latter dries within about a minute and then comes off, together with the adsorbed dirt, in the form of scales, leaving the hands clean, dry and smooth. In this application, the paste may be admixed with a small quantity of a surfactant and some alcohol which makes its cleaning effect more thorough.

*Cosmetic preparations.*—The aqueous paste as well as the dried product is an excellent body for cleansing lotions, toothpastes and other cosmetic products.

*Foodstuffs.*—The product is not accessible to the digestive ferments of the human body. It is, therefore, a useful filler or extender for low-calorie dietetic food preparations.

*Filler for technical purposes.*—As a filler for plaster of Paris the degraded cellulose according to the invention increases the strength and resilience of building elements made from such mixes and allows them to be nailed without cracking. It can also serve, especially in the dry state, as a carrier for dyes, or pigments, as a filler for synthetic resins and for analogous purposes.

*Applications in chemical industry.*—The product has a high adsorptive efficiency and can be used as an adsorbent. It is, moreover, a useful starting material for the manufacture of cellulose derivatives where a low degree of polymerization, uniformity of substitution and high reactivity are required.

The invention is illustrated by the following examples to which it is not limited.

Example 1

100 grams of bleached cotton linters having a water content of about 10% by weight was introduced into a reaction vessel in which 1000 grams of aqueous sulfuric acid of 70%-by-weight strength was maintained at a temperature of 38 to 40° C. The cellulosic matter dissolved within 2 minutes, and after a further 2 minutes a marked decrease of viscosity occurred. At the end of 5 minutes from the introduction of the cellulosic matter into the sulfuric acid, the reaction solution was diluted with 2.5 liters of cold water, whereby the degraded cellulose was precipitated. The slurry thus formed was filtered, the residue was washed with water on the filter and finally formed about 600 grams of a paste containing about 85% by weight of water.

Example 2

A hand cleaner of excellent cleansing properties was made by the incorporation, with thorough stirring, of 20 grams of lauryl sulfate and 100 grams of ethyl alcohol of 95%-by-volume strength into 1000 grams of the paste prepared in accordance with Example 1.

Example 3

66 grams of the paste prepared in accordance with Example 1 (containing 10 grams of degraded cellulose, calculated as dry matter) were admixed to 1 kg. of calcium sulfate dihydrate and the mixture was dehydrated by being heated at 150° C. for 50 minutes. Building elements and other castings made from the plaster of Paris mixture thus prepared had an increased strength and resilience, as compared with products made from the same kind of plaster of Paris without filler, and they could be nailed without cracking.

Example 4

200 grams of the paste prepared in accordance with Example 1 were mixed with 115 grams of sugar and a few drops of a commercial vanillin extract. The mixture formed a tasty low-calorie dessert of creamy consistency. Its taste could still be improved by the addition of some milk. The caloric value of the product could be lowered still if the sugar was replaced by an artificial sweetener.

We claim:

1. Degraded cellulose consisting of very finely divided amorphous particles insoluble in water but capable of forming colloidal aqueous dispersions, said cellulose being made by a process comprising dissolving cellulosic matter within a time not exceeding 10 minutes at a temperature of about 35° to 45° C. in an aqueous sulfuric acid medium containing 65% to 75% by weight of $H_2SO_4$, then diluting the solution with water, and finally separating from the acidic aqueous liquor the precipitate of degraded cellulose thereby formed.

2. A process for the manufacture of degraded cellulose consisting of very finely divided amorphous particles insoluble in water but capable of forming colloidal aqueous dispersions, wherein cellulosic matter is dissolved within a time not exceeding 10 minutes at a temperature of about 35° to 45° C. in an aqueous sulfuric acid medium containing 65% to 75% by weight of $H_2SO_4$, the solution is then diluted with water and the precipitate of degraded cellulose thereby formed is separated from the acidic aqueous liquor.

3. A process according to claim 2 wherein the proportion of the reactants is of the order of 1 to 2 parts by weight of cellulosic material, calculated as dry matter, for 10 parts of sulfuric acid of the specified concentration.

4. A process according to claim 2, wherein the aqueous sulfuric acid medium has a concentration of 70% to 73% by weight of $H_2SO_4$.

5. A process according to claim 2, wherein the precipitate of degraded cellulose is washed and neutralized.

6. A process according to claim 2, wherein after the dissolution of the cellulose the solution is diluted with so much water that the acid concentration is lowered to about 20% to 25% by weight of $H_2SO_4$.

7. A process according to claim 2, wherein native cellulose is used as a starting material.

8. A process according to claim 7, wherein cotton linters are used as a starting material.

9. A process according to claim 2, wherein regenerated cellulose is used as a starting material.

References Cited

UNITED STATES PATENTS

| | | | |
|---|---|---|---|
| 1,412,949 | 4/1922 | Luttringhaus | 260—212 |
| 1,771,460 | 7/1930 | Lilienfeld | 260—212 |
| 1,954,378 | 4/1934 | Day | 106—115 |
| 2,978,446 | 4/1961 | Battista et al. | 167—85 |
| 3,146,170 | 8/1964 | Battista | 167—85 |
| 3,251,824 | 5/1966 | Battista | 167—85 X |

ALBERT T. MEYERS, *Primary Examiner.*

D. R. MAHANAND, *Assistant Examiner.*